Nov. 1, 1938.                P. BLASER                2,135,381
                    AEROPLANE PROPELLER DRIVE MECHANISM
                        Filed May 20, 1937       2 Sheets-Sheet 1
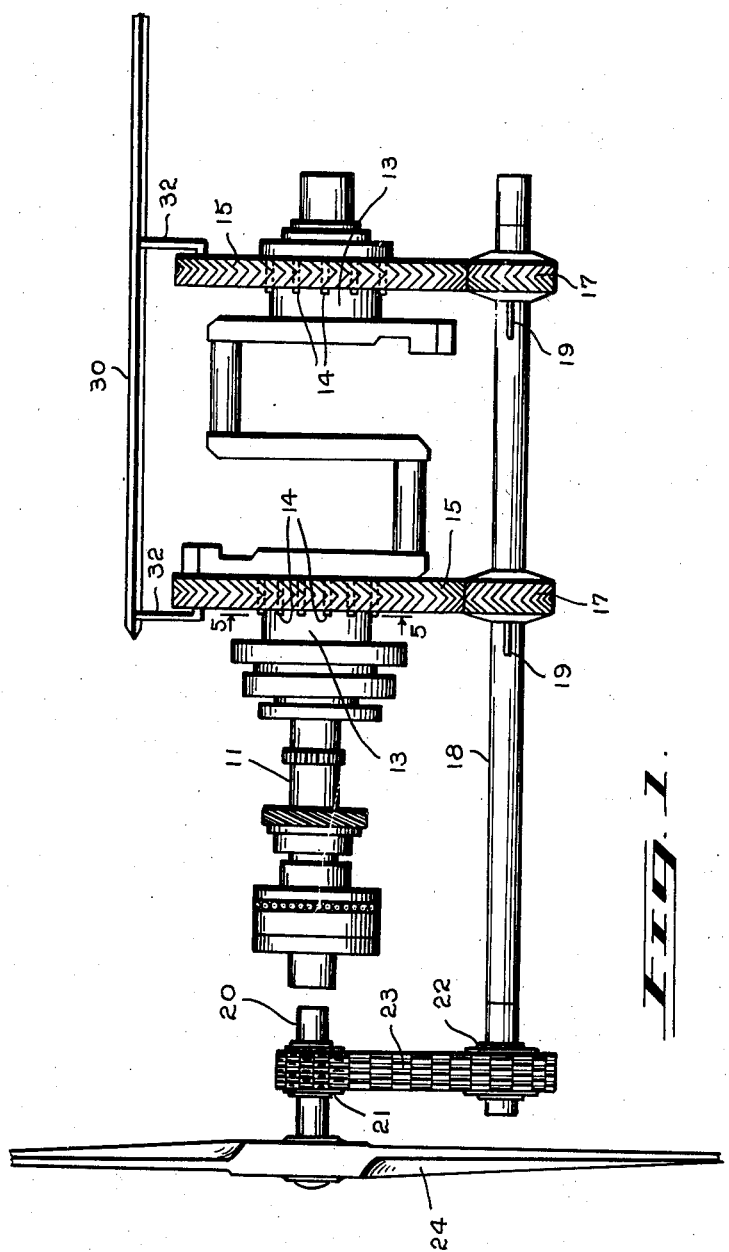
INVENTOR
Paul Blaser
By Ralph Burch
    Attorney

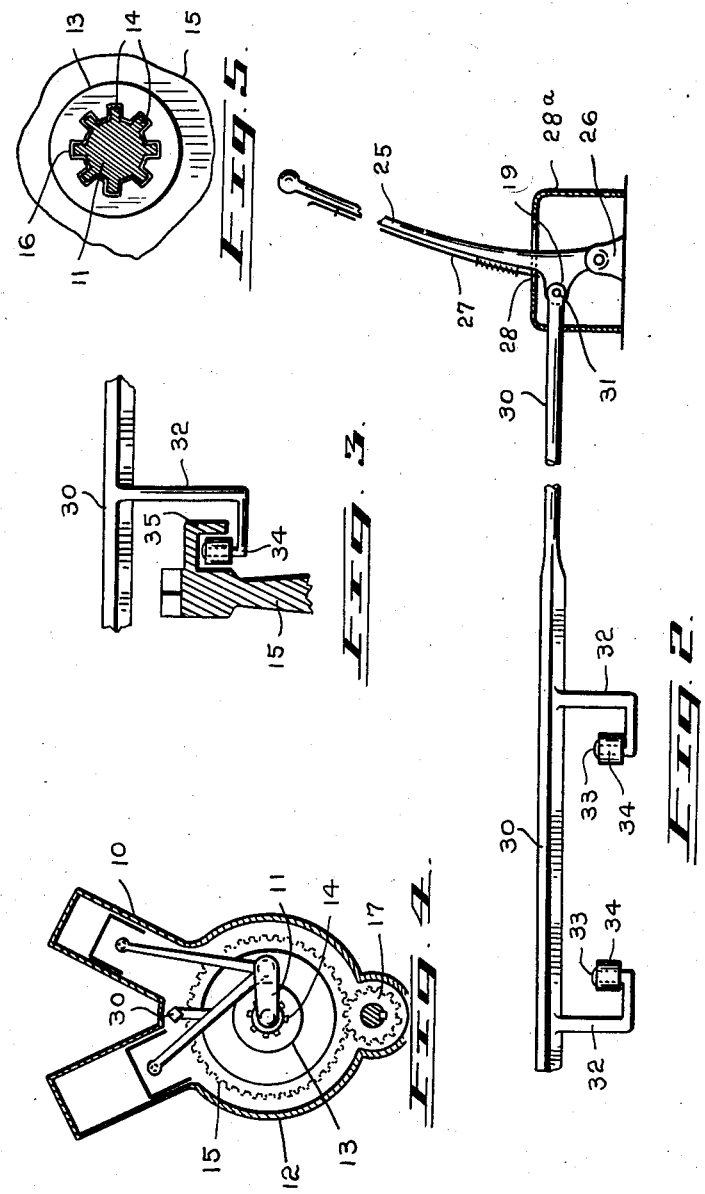

Patented Nov. 1, 1938

2,135,381

UNITED STATES PATENT OFFICE 2,135,381

AEROPLANE PROPELLER DRIVE MECHANISM

Paul Blaser, Rosevear, Alberta, Canada, assignor of fifty per cent to John Blaser, Rosevear, Alberta, Canada Application May 20, 1937, Serial No. 143,821
In Canada June 30, 1936

1 Claim. (Cl. 74—400)

This invention relates to improvements in aeroplane propeller drive mechanism. Its primary object is to provide means to connect or disconnect the propeller from the engine thereby permitting the latter to run free while warming up and also to permit the engine to be closed off and the propeller being allowed to rotate while gliding thereby increasing the distance which a plane may glide for a safe landing place in case of engine failure.

A further object of the invention is to provide means to move certain gears laterally along the engine drive shaft to disconnect the same from splines formed thereon and thereby permit either the shaft or the gears to rotate or remain stationary independent of each other.

With these and other objects in view that may appear while the description proceeds the invention consists in the novel construction and arrangement of parts as hereinafter more specifically set forth, claimed and shown in the accompanying drawings forming part of this application and in which:—

Fig. 1 is a general view of the main drive shaft of an aeroplane engine, showing the countershaft and propeller shaft as related thereto.

Fig. 2 is a view of the gear shifting means and the actuating lever therefor.

Fig. 3 is an enlarged detail fragmentary view of the gear shifting means.

Fig. 4 is a diagrammatic sectional view through a typical V type engine showing the position of the gears and gear shifting means therein.

Fig. 5 is a fragmentary cross-section view through the drive shaft on the line 5—5 of Fig. 1 showing the splines formed thereon.

Referring more in detail to the drawings in which similar reference characters designate corresponding parts throughout the several views it will be seen the invention comprises an aeroplane engine 10 preferably of the V type having a main drive or crank shaft 11 disposed therein. While the drawings depict a crank shaft having only two cranks this is understood to be diagrammatic only as the device may be applied to an engine of any size or number of cylinders. The shaft is mounted in the crank case 12 in the usual manner and rotatably supported therein. Adjacent to each end of the crank shaft two hubs 13 are provided and are formed as integral parts of the shaft. On the said hubs a plurality of keys or splines 14 are formed and extend approximately half the width thereof. Two gears 15 are slidably mounted on the said hubs 13 and are constructed with keyways 16 therein arranged to register with the splines 14. Said gears are arranged to be slidable on the hubs to engage the said splines and be consequently driven by the shaft or to be disengaged therefrom and thereby permit the shaft and the gears to either rotate or remain stationary independently from each other.

The gears 15 engage two smaller gears 17 mounted on a countershaft 18 which is positioned in parallel relation to the crank shaft and preferably immediately below the same. The said gears 17 are likewise slidably mounted on the countershaft 18 and connected thereby by keys or splines 19 in the shaft and corresponding keyways in the hubs of the gears. The gears are constructed with so called herringbone gear teeth so that the lateral movement of the driving gears will be transmitted to the driven gears and will therefore remain constantly engaged with each other.

The countershaft 18 transmits the power from the crank shaft to the propeller shaft 20 by means of the aforementioned gears and a pair of chain gears 21 and 22 connected together by a chain 23. By this means the propeller 24 may be driven at any predetermined ratio of speed with respect to the speed of the engine.

The gears 15 are moved laterally by means of a gear lever 25 positioned so as to be convenient for manipulation by the operator. Said lever is pivotally connected to part of the permanent structure by a bracket 26. A spring retaining member 27 is provided on the lever and is arranged to engage apertures 28 in the housing 28a, and thereby retain the said lever in the free or engaged position. A boss 29 is constructed on the said lever and the gear shift rod 30 is pivotally connected thereto by a pin 31. Said gear shift rod enters the crank case and is arranged to slide back and forth therein as the lever is moved. Two depending arms 32 are formed thereon having their extremities 33 upturned and small anti-friction roller members 34 rotatably mounted thereon. A channel 35 is formed on side of the gears 15 as shown in Fig. 3 and the roller members 34 on the gear shift arms 32 are engaged therein. It will be seen from this construction that a longitudinal movement of the gear shift rod will thereby move the gears 15 on the crank shaft to either free them from the said shaft or engage them to the shaft and thereby attain the objects of the invention.

It is believed that the construction and advantages of the structure shown may be apparent from the foregoing paragraphs, taken in conjunction with the accompanying drawings without further detailed description.

While the preferred embodiment of the invention has been disclosed it is understood that minor changes in the details of construction, combination and arrangement of co-operating elements may be resorted to within the scope of what is claimed without departing from the spirit of the invention.

I claim:

A gear driving mechanism comprising an engine crank shaft, hubs fixed on opposite ends of said crank shaft, splines formed on one-half of said hubs, gear wheels slidably mounted on said hubs having keyways to engage with said splines to establish driving connection between said hubs and gear wheels, means for shifting said gear wheels longitudinally of said hubs to engage and disengage said splines from the keyways of said gear wheels, a countershaft mounted in parallel relation to said crank shaft and small gears slidably keyed on said countershaft in constant mesh with said gear wheels.

PAUL BLASER.